United States Patent
Schiavi et al.

(10) Patent No.: US 7,043,333 B2
(45) Date of Patent: May 9, 2006

(54) DEVICE FOR CHECKING THE POSITION OF A SPINDLE IN A MACHINE TOOL

(75) Inventors: Bruno Schiavi, Piacenza (IT); Sandro Foletti, Piacenza (IT)

(73) Assignee: JOBS S.p.A., Piacenza (IT)

( * ) Notice: Subject to any disclaimer, the term of this patent is extended or adjusted under 35 U.S.C. 154(b) by 40 days.

(21) Appl. No.: 10/797,058

(22) Filed: Mar. 11, 2004

(65) Prior Publication Data

US 2004/0181306 A1 Sep. 16, 2004

(30) Foreign Application Priority Data

Mar. 13, 2003 (IT) .......................... BO2003A0141

(51) Int. Cl.
*G06F 19/00* (2006.01)
(52) U.S. Cl. .................... 700/186; 318/574; 409/231
(58) Field of Classification Search ................ 700/186, 700/193, 192; 318/574; 409/208, 231
See application file for complete search history.

(56) References Cited

U.S. PATENT DOCUMENTS 3,596,153 A * 7/1971 Brainard et al. ............ 318/574
6,218,983 B1 * 4/2001 Kerry et al. ................. 342/149
6,311,803 B1   11/2001 Turk
2003/0016367 A1   1/2003 Hermann et al.

FOREIGN PATENT DOCUMENTS

DE          19630205        1/1998
DE          10114090        10/2001
GB          2319615         5/1998

OTHER PUBLICATIONS

European Search Report dated Jun. 17, 2004.

* cited by examiner

*Primary Examiner*—Leo Picard
*Assistant Examiner*—Sheela S. Rao
(74) *Attorney, Agent, or Firm*—Harbin King & Klima

(57) ABSTRACT

In a machine tool with a spindle capable of motion along at least three axes x, y, and z, the position of the spindle is checked by a device that operates utilizing electromagnetic signals sent out by four emitters, located externally of the machine tool, and picked up by a receiver mounted directly to the spindle. The signals are fed into a master control unit and processed by circuits in such a way as to produce an output that can be used to verify and if necessary correct the position of the spindle on the three axes X, Y, and Z.

22 Claims, 2 Drawing Sheets

DEVICE FOR CHECKING THE POSITION OF A SPINDLE IN A MACHINE TOOL

This application claims priority to Italian Patent Application No. BO 2003 A 000141, filed Mar. 13, 2003 which is incorporated by reference herein.

BACKGROUND OF THE INVENTION

The present invention relates to a device for checking the position of a spindle in a machine tool.

The invention has application in machine tools of the type that comprise a bearing structure composed of two longitudinal and parallel slide ways mounted on respective vertical stands, and a beam or gantry traversable on the ways along an axis designated X, supporting a unit that comprises an upright pillar aligned on a vertical axis, of which the bottom end carries a machining head equipped with a spindle to which a tool can be attached.

In general, the pillar can be traversed on the beam horizontally, along an axis designated Y, in a direction transverse to the traversing direction of the beam. The pillar is also slidable vertically along a third axis designated Z, in such a manner that the machining head can be raised and lowered relative to a machining station beneath, which is occupied by a fixture holding a part for machining.

For particular types of operation, finally, the machining head is able to rotate about an axis C parallel to the vertical axis Z, whilst the spindle is also pivotable on an axis A transverse to the selfsame axis Z.

In order to control a machine tool of the type described above, it must be known from one moment to the next exactly where the tool is positioned, during the entire machining process. Using prior art methods, the position of the spindle in space is identified indirectly by optical, mechanical or encoder type systems capable of measuring the x, y and z coordinates of the spindle relative to the point of origin in a Cartesian system established by the X, Y and Z axes and associated rigidly with the fixed structure of the machine tool.

In consequence, the reliability of the measuring system in question, which depends on the connection between fixed and moving parts of the machine, is based on the assumption that the structure will be correctly and stably positioned in relation to the machining station. Similarly, it is assumed that the geometrical positions of the various machine components, namely the slide ways, beam and pillar, will be maintained within prescribed tolerances.

It happens however that the geometrical positions in question cannot always be maintained, and there is also the factor of variations in the structure, caused for example by the effects of load-related heat and deformation, which introduce errors into the measurement.

The object of the present invention, accordingly, is to provide a device for checking the position of a spindle in a machine tool that will be unaffected by the aforementioned drawbacks typical of prior art devices.

SUMMARY OF THE INVENTION

The stated object is realized according to the present invention in a device for checking the position of a spindle in a gantry type machine tool positionable along at least three axes X, Y, and Z within a predetermined machining zone. The device comprises a plurality of emitters placed externally of the machine and generating electromagnetic signals, a receiver mounted to the spindle and capable of picking up the electromagnetic signals, also a master control unit, connected on the output side to the drive motors by which the spindle is set in motion along the axes and incorporating circuits designed to process and output signals indicating the distance between each of the emitters and the receiver, and further circuits serving to identify the position of the spindle on the basis of the signals indicating the distances between the emitters and the receiver.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
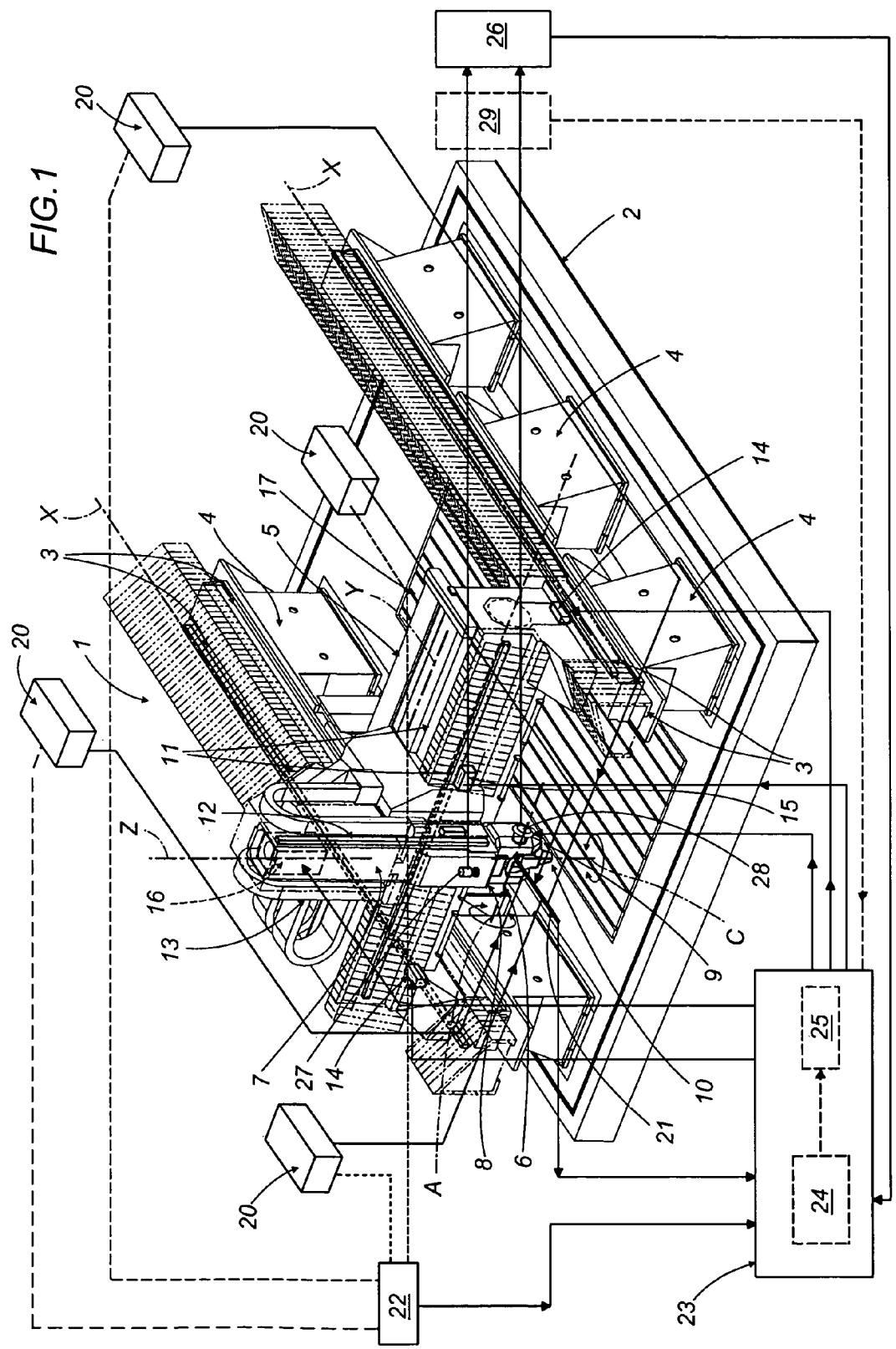
FIG. 1 illustrates a machine tool equipped with a checking device embodied according to the present invention, viewed schematically in perspective and partly as a block diagram.

With reference to the figures of the accompanying drawings, 1 denotes a machine tool in its entirety, comprising a bed 2 and presenting two longitudinal parallel slide ways 3 supported by corresponding vertical stands 4. Mounted on the slide ways 3, and capable of traversing thus along an axis denoted X, is a horizontal beam or gantry 5 set transversely to the ways 3 and supporting a unit 6 that includes a vertical pillar 7 positioned perpendicularly to the gantry 5, of which the bottom end 8 carries a machining head 9 equipped with a spindle 10 such as can be fitted with a tool (not illustrated). The pillar 7 is traversable on respective slide ways 11 afforded by the gantry 5, along a second horizontal axis Y extending transversely to the axis X first mentioned, and capable also of movement on vertical ways 12 along a relative vertical axis Z.

The longitudinal ways 3, the gantry 5 and the vertical pillar 7 combine to create a structure 13 serving to support the spindle 10 and incorporating means by which to position the selfsame spindle 10; such means consist in motors 14, 15 and 16 able respectively to set the gantry 5 in motion along the X axis, and to set the pillar 7 in motion along the Y axis and the Z axis.

The motors in question might be of any given type, including conventional motors coupled to a mechanical rack-and-pinion drive, or alternatively, by way of example, linear electric motors.

The space between the longitudinal slide ways 3, beneath the gantry 5, accommodates a machining station 17 in which to position a fixture 18 (see FIG. 2) that serves to support a part 19 for machining.

The machine 1 as described thus far falls into the category of three axis machine tools, whereas in a so-called five-axis machine, the machining head 9 is able to rotate about an axis C parallel to the vertical axis Z, and the spindle 10 can be made to pivot on an axis A transverse to this same axis Z through the agency of respective drive means not shown in the drawings.

The device according to the invention comprises emitter means represented as blocks denoted 20, installed on a level above the machine tool 1, for example at four fixed points of the building in which one or more such machine tools 1 are housed, such as will radiate electromagnetic signals that can be picked up by receiver means 21 installed on the spindle 10. The emitter means 20 are furnished with respective time measuring means synchronized one with another and represented by a single block denoted 22.

A block denoted 23 represents a master control unit comprising respective data processing and transmission means, denoted by a block 24 drawn with phantom lines and designed to generate signals indicating the distance between each of the emitter means 20 and the receiver means 21.

The data processing and transmission block 24 is connected to a block 25 representing means by which to identify the position of the spindle 10 on the basis of the signals received from the processing block 24.

The master control unit 23 is connected on the output side to the aforementioned motors 14, 15 and 16, in such a manner that these can be piloted to correct the position of the spindle 10 by adjusting the positions on the three axes X, Y and Z.

In the event that the machining head 9 is able to rotate about the aforementioned vertical axis C and the spindle 10 is pivotable about the horizontal axis A, the device according to the invention will also comprise means, shown as a block denoted 26, able to detect the orientation of the polar axes A and C and supply respective output signals to the master control unit 23 in such a way as to allow of piloting the operation of motors (not illustrated) by which the rotary motion of the machining head 9 and the pivoting action of the spindle 10 are generated.

The data processing and transmission means 24 which indicate the distance between the emitter means 20 and the receiver means 21 are designed to compute the distance D in question on the basis of the time taken by the signal to travel between each of the emitter means 20 and the receiver means 21. In effect, the send time (T1) and receive time (T2) of the electromagnetic signals are known to the time measuring means 22, whereas the velocity (c) of the signals is equal to the speed of light.

For each of the emitter means 20, therefore:

$$D=c(T2-T1)$$

The four distances D thus obtained provide input information for a computing procedure by which to obtain the three coordinates x, y and z that will define the position of the tool univocally.

The computing procedure is one of triangulation, based on an operation involving the intersection of three spheres of which the radii are obtained by applying the above formula and the centers coincide with the spindle 10. The procedure produces two possible solutions, and the correct solution is identified by using the intersection of the fourth sphere, from which the position of the spindle is identified univocally.

Where the machine tool is a five-axis type, in which case the device according to the invention would include means able to detect the orientation of the two polar axes A and C, the detection means in question will incorporate means able to sense a rotation of the head 9 about the one polar axis A, illustrated as a block denoted 27, and means able to sense a pivoting movement relative to the other polar axis C, illustrated as a block denoted 28. Such means 27 and 28 could consist, for example, in rotary encoders or gyroscope devices.

The means 27 and 28 in question are connected on the output side to a block denoted 29 serving to process the respective signals, which is connected in turn to the master control unit 23.

To determine the position of the spindle 10 in the case of a five-axis machine tool, the device according to the invention utilizes the computing procedures as described above for a three-axis machine, integrated with the information provided by the processing block 29.

To advantage, the four emitters 20 are able to monitor a plurality of machine tools 1 installed internally of the same building, or two or more spindles 10 of a single machine 1.

The emitters 20 can be of whatever type, that is to say, emitters of electromagnetic waves in the radiofrequency part of the spectrum, transmitters of radar waves, or transmitters of laser signals.

Correspondingly, the receiver 21 will be a radio receiving antenna, a radar target, or in the case of laser signals, a reflective target.

Figure 2:
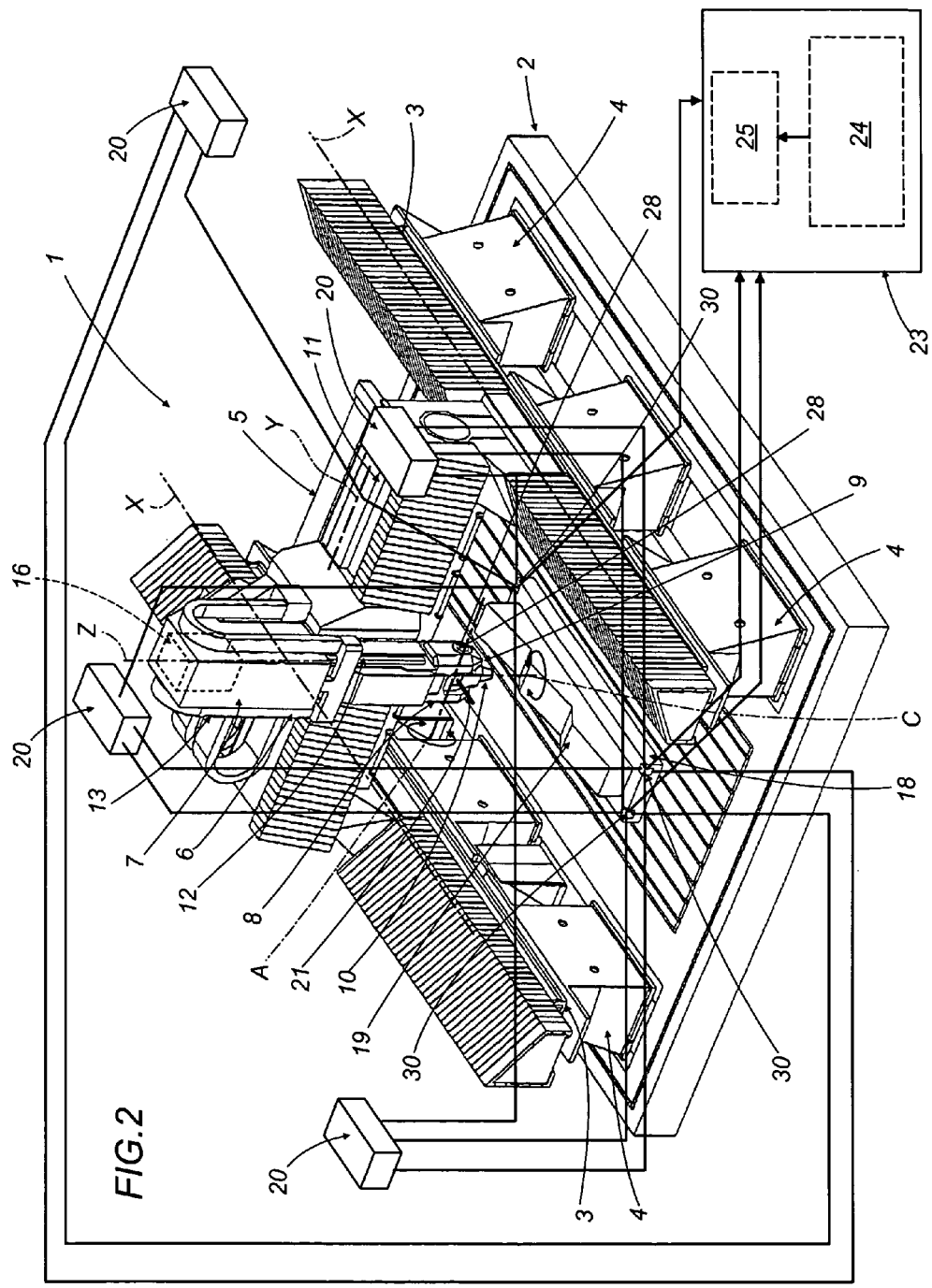
FIG. 2 illustrates the machine tool of FIG. 1, equipped with a checking device in an alternative embodiment, viewed schematically in perspective and partly as a block diagram.

Referring to FIG. 2, the fixture 18 serving to hold a part 19 in process is prepared by precision machining operations used to fashion the seats that will accommodate the parts 19.

To ensure machining operations are carried out with the necessary precision, the positions of the part 19 must be maintained steady over time and for this reason the relative positioning of the machine tool 1 and the fixtures 18 holding the part 19 must also be known to the device disclosed.

The positioning coordinates of the fixture 18 relative to the machine 1 are computed by a machine operator and the data entered by the operator in a machine controller at the start of each machining cycle.

In the same way as mentioned with reference to the structure 13 supporting the spindle, the system serving to detect the position of the tool during the machining cycle can be affected by errors due to thermal expansion of the fixture 18.

Accordingly, the fixture 18 will be furnished with at least one set of means 30 able to receive electromagnetic signals from the emitter means 20. The computing procedure is the same as described previously.

What is claimed is:

1. A device for checking a position of a spindle in a machine tool presenting a structure serving to support the spindle and means for setting the spindle in motion along three axes X, Y, and Z within a predetermined machining zone, comprising:

a plurality of means, located externally of the machine tool, for emitting electromagnetic signals;

means, installed on the spindle, for receiving electromagnetic signals;

a master control unit connected on an output side to the means for setting the spindle in motion along the axes and incorporating means for processing and transmitting signals indicating the distance between each of the emitting means and the receiving means; and means for identifying the position of the spindle on the basis of the signals indicating the distances between the emitting and receiving means.

2. A device as in claim 1, wherein each of the means for emitting electromagnetic signals is associated with one of a corresponding plurality of respective time measuring means synchronized one with another.

3. A device as claim 2, wherein the means for processing and transmitting signals indicating the distance between each of the emitting means and the receiving means are able to determine the selfsame distance on the basis of the time taken by the electromagnetic signal to travel between the emitting means and the receiving means.

4. A device as in claim 1, wherein the spindle is set in motion within the machining zone, by relative means, about two further polar axes A and C, and means for detecting the orientation of the polar axes A and C are connected to processing means connected in turn on an output side to the master control unit.

5. A device as in claim 4, wherein the detection means comprise rotary encoders.

6. A device as in claim 4, wherein the detection means comprise gyroscope devices.

7. A device as in claim 1, wherein the means for emitting electromagnetic signals include emitters of electromagnetic waves in a radio-frequency part of the spectrum, and the receiving means includes a receiving antenna.

8. A device as in claim 1, wherein the means for emitting electromagnetic signals include transmitters of radar waves, and the receiving means includes a radar target.

9. A device as in claim 1, wherein the means for emitting electromagnetic signals include transmitters of laser signals, and the receiving means includes a reflective target.

10. A device as in claim 1, installed in a system including a plurality of machine tools and relative spindles, wherein the means for emitting electromagnetic signals and the master control unit are embodied as a single entity operating in conjunction with each of the receiving means associated with the single spindles.

11. A device as in claim 1, installed in a machine tool of which the predetermined machining zone is occupied by a fixture serving to support a part for machining, wherein the fixture comprises at least one set of receiving means for picking up the electromagnetic signals from the emitting means and connected to means for processing and outputting signals indicating the distance between each of the emitting means and the receiving means.

12. A device as in claim 1, wherein the method of computation utilized by the processing means is that of triangulation.

13. A device as in claim 2, wherein the means for emitting electromagnetic signals include emitters of electromagnetic waves in the radio-frequency part of the spectrum, and the receiving means includes a receiving antenna.

14. A device as in claim 3, wherein the means for emitting electromagnetic signals include emitters of electromagnetic waves in the radio-frequency part of the spectrum, and the receiving means includes a receiving antenna.

15. A device as in claim 4, wherein the means for emitting electromagnetic signals include emitters of electromagnetic waves in the radio-frequency part of the spectrum, and the receiving means includes a receiving antenna.

16. A device as in claim 5, wherein the means for emitting electromagnetic signals include emitters of electromagnetic waves in the radio-frequency part of the spectrum, and the receiving means includes a receiving antenna.

17. A device as in claim 6, wherein the means for emitting electromagnetic signals include emitters of electromagnetic waves in the radio-frequency part of the spectrum, and the receiving means includes a receiving antenna.

18. A device as in claim 2, wherein the means for emitting electromagnetic signals include transmitters of radar waves, and the receiving means includes a radar target.

19. A device as in claim 3, wherein the means for emitting electromagnetic signals include transmitters of radar waves, and the receiving means includes a radar target.

20. A device as in claim 4, wherein the means for emitting electromagnetic signals includes transmitters of radar waves, and the receiving means includes a radar target.

21. A device for checking the position of a spindle in a machine tool presenting a structure serving to support the spindle and means for setting the spindle in motion along three axes X, Y, and Z within a predetermined machining zone, comprising:

a plurality of means, located externally of the machine tool, for emitting electromagnetic signals;

means, installed on the spindle, for receiving electromagnetic signals;

a master control unit connected on an output side to the means for setting the spindle in motion along the axes and incorporating means for processing and transmitting signals indicating the distance between each of the emitting means and the receiving means; and means for identifying the position of the spindle on the basis of the signals indicating the distances between the emitting and receiving means;

said device being installed in a machine tool of which the predetermined machining zone is occupied by a fixture serving to support a part for machining, wherein the fixture comprises at least one set of receiving means for picking up the electromagnetic signals from the emitting means and connected to means for processing and outputting signals indicating the distance between each of the emitting means and the receiving means.

22. A device for checking the position of a part to be machined in a machine tool presenting a structure serving to support the spindle and means for setting the spindle in motion along three axes X, Y, and Z within a predetermined machining zone, comprising:

a plurality of means, located externally of the machine tool, for emitting electromagnetic signals;

a fixture serving to support the part for machining, wherein the fixture comprises at least one set of receiving means for picking up the electromagnetic signals from the emitting means and connected to means for processing and outputting signals indicating the distance between each of the emitting means and the receiving means.

* * * * *